United States Patent
Liu

(10) Patent No.: US 8,713,227 B2
(45) Date of Patent: Apr. 29, 2014

(54) ACCESSING DEVICE VIA COMMUNICATION PROTOCOL SELECTION

(75) Inventor: Chien-Hung Liu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 94 days.

(21) Appl. No.: 13/444,315

(22) Filed: Apr. 11, 2012

(65) Prior Publication Data

US 2013/0138837 A1    May 30, 2013

(30) Foreign Application Priority Data

Nov. 29, 2011    (TW) .............................. 100143662 A

(51) Int. Cl.
*G06F 13/12*    (2006.01)
*G06F 12/00*    (2006.01)

(52) U.S. Cl.
USPC ............................................ 710/72; 711/103

(58) Field of Classification Search
None
See application file for complete search history.

(56) References Cited

U.S. PATENT DOCUMENTS

2012/0042120 A1*    2/2012    Ni et al. ........................ 711/103

* cited by examiner

*Primary Examiner* — Hyun Nam
(74) *Attorney, Agent, or Firm* — McClure, Qualey & Rodack, LLP

(57) ABSTRACT

An accessing device communicating with a host device and including a connector, a storage unit and a control unit is disclosed. The connector connects to the host device. The storage unit stores data. The control unit communicates with the storage unit according to a first communication protocol and communicates with the host device via the connector according to a second communication protocol. The control unit determines the kind of the second communication protocol according to selection information.

12 Claims, 4 Drawing Sheets

ACCESSING DEVICE VIA COMMUNICATION PROTOCOL SELECTION

CROSS REFERENCE TO RELATED APPLICATIONS

This application claims priority of Taiwan Patent Application No. 100143662, filed on Nov. 29, 2011, the entirety of which is incorporated by reference herein.

BACKGROUND OF THE INVENTION

1. Field of the Invention

The invention relates to an accessing device, and more particularly to an accessing device, which can adjust the kind of a communication protocol between itself and a host device.

2. Description of the Related Art

With technological development, image, video and data can be stored in an accessing device. When the accessing device is connected to a host device, the image, video or data may be seen, heard, or accessed by the host device. The host device may copy files to the accessing device or read the files from the accessing device. To quickly achieve the accessing action between the host device and the accessing device, a large communication bandwidth is required between the accessing device and the host device. Thus, numerous communication protocols with high communication speeds have been developed, such as a USB 3.0 communication protocol or an external serial advanced technology attachment (eSATA) communication protocol.

Taking the USB 3.0 communication protocol as an example, the communication protocol can quickly access files from a host device. However, the communication protocol does not require a large communication bandwidth to access the image or the video (e.g. MP4). Thus, if the USB 3.0 communication protocol is still utilized to access the image or the video, the power of the accessing device utilizing the USB 3.0 communication protocol is quickly consumed. Furthermore, since the power consumption of the accessing device utilizing the USB 3.0 communication protocol is large, if the accessing device is utilized to transmit data with low bandwidth, the accessing device gets very hot.

In addition, when the communication protocol between the accessing device and the host device is fixed, and the accessing device is replaced by another accessing device comprising a high speed storage unit, the high speed storage unit is limited to the fixed communication protocol with the low communication speed. Thus, the high speed storage unit cannot achieve optimum efficacy.

BRIEF SUMMARY OF THE INVENTION

In accordance with an embodiment, an accessing device communicating with a host device comprises a connector, a storage unit and a control unit. The connector connects to the host device. The storage unit stores data. The control unit communicates with the storage unit according to a first communication protocol and communicates with the host device via the connector according to a second communication protocol. The control unit determines the kind of the second communication protocol according to selection information.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
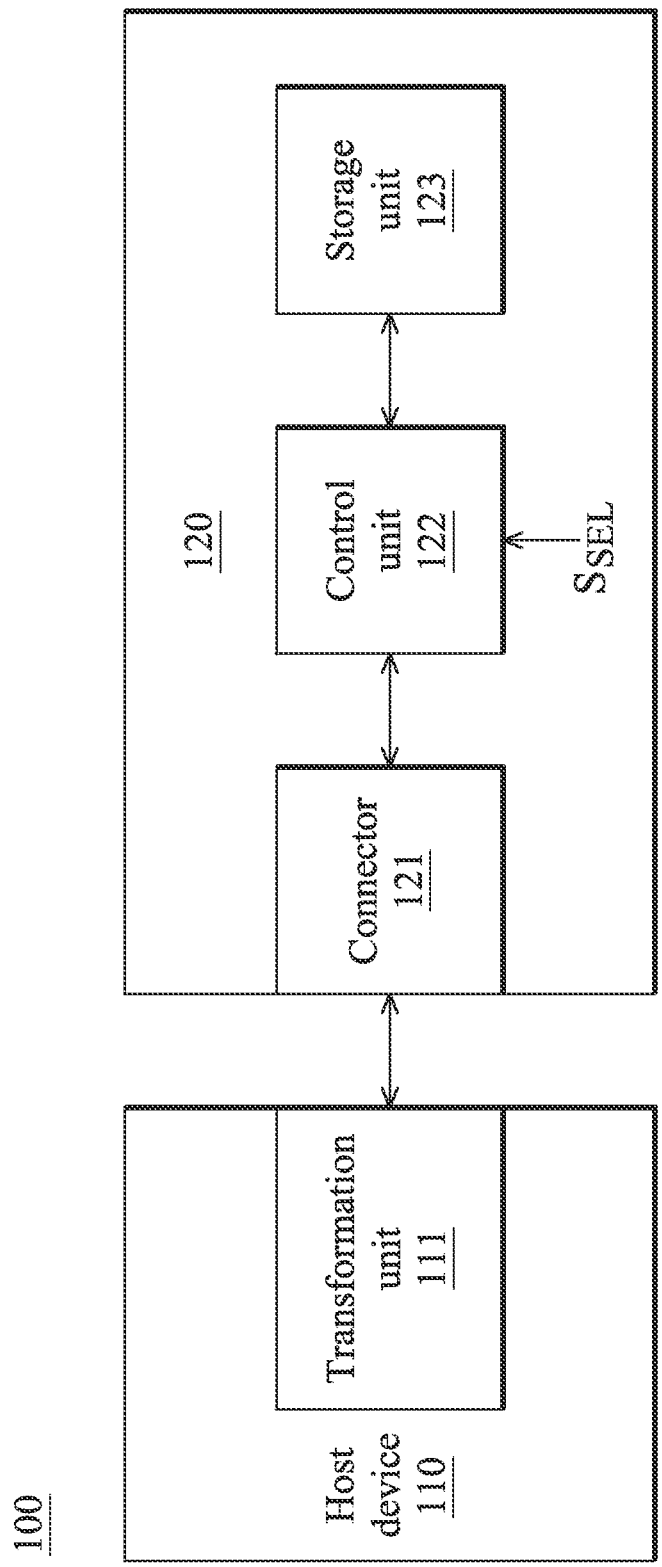
FIG. 1 is a schematic diagram of an exemplary embodiment of an operation system.

FIG. 1 is a schematic diagram of an exemplary embodiment of an operation system. The operation system 100 comprises a host device 110 and an accessing device 120. The host device 110 is capable of reading data stored in the accessing device or writing data to the accessing device 120. The invention does not limit the kind of the host device 110. Any device can serve as the host device 110, as long as the device is capable of communicating with the accessing device 120. In one embodiment, the host device 110 is a desktop computer or a notebook (NB).

The accessing device 120 communicates with the host device 110 according to a specific communication protocol. The accessing device 120 determines the kind of the specific communication protocol according to selection information $S_{SEL}$. In other words, the accessing device 120 can determine the communication speed between the accessing device 120 and the host device 110. The invention does not limit the source of the selection information $S_{SEL}$. In one embodiment, the selection information $S_{SEL}$ is provided from the host device 110. In other embodiments, the selection information $S_{SEL}$ is set by a user, as discussed in more detail below.

In this embodiment, the accessing device 120 comprises a connector 121, a control unit 122 and a storage unit 123. The connector 121 is coupled to the host device 110. In one embodiment, the signal transmitted by the connector 121 conforms to a USB 2.0 communication protocol, a USB 3.0 communication protocol or an external serial advanced technology attachment (eSATA).

The invention does not limit the kind of the connector 121. In this embodiment, the connector 121 is a USB 3.0 connector. However, when the host device 110 only comprises a SATA slot, a transformation device 111 is arranged with the SATA slot of the host device 110 or with the connector 121. Thus, the host device 110 can communicate with the accessing device 120. The invention does not limit the kind of the transformation device 111. Any device can serve as the transformation device 111, as long as the device is capable of connecting to the host device 110 and the accessing device 120.

In this embodiment, the control unit 122 communicates with the storage unit 123 according to a first communication protocol. The control unit 122 communicates with the host device 110 via the connector 121. The control unit 122 communicates with the host device 110 according to a second communication protocol and the selection information $S_{SEL}$. The invention does not limit the kinds of the first and the second communication protocols. In one embodiment, the first communication protocol relates to the kind of the storage unit 123 and the second communication protocol relates to the selection information $S_{SEL}$.

For example, if the storage unit 123 is a solid state drive (SSD) or a hard disk drive (HDD), the first communication protocol between the control unit 122 and the storage unit 123 is an eSATA. In another embodiment, if the storage unit 123 is a memory card, the first communication protocol between the control unit 122 and the storage unit 123 is a secure digital extended capacity (SDXC) protocol.

In other embodiments, if the storage unit 123 is a flash memory or an NAND flash memory, the first communication protocol between the control unit 122 and the storage unit 123 is a common flash memory interface (CFI) protocol or an open NAND flash interface (ONFI) protocol.

In one embodiment, the selection information $S_{SEL}$ is set by an external button or an external switch. In another embodiment, the selection information $S_{SEL}$ is provided and set from the host device 110. The communication protocol between the accessing device 120 and the host device 110 is determined according to the state of the selection information $S_{SEL}$.

For example, when the selection information $S_{SEL}$ is in a first state, the accessing device 120 communicates with the host device 110 according to a USB 2.0 communication protocol. When the selection information $S_{SEL}$ is in a second state, the accessing device 120 communicates with the host device 110 according to a USB 3.0 communication protocol. When the selection information $S_{SEL}$ is in a third state, the accessing device 120 communicates with the host device 110 according to an eSATA communication protocol. For example, when the accessing device 120 accesses the host device 110, the selection information $S_{SEL}$ is set to determine a communication protocol between the accessing device 120 and the host device 110, wherein the communication protocol (e.g. USB 3.0 or eSATA) has high speed. On the contrary, when the communication bandwidth between the accessing device 120 and the host device 110 is 0.3 MB~3 MB, the selection information $S_{SEL}$ is set to determine a communication protocol between the accessing device 120 and the host device 110, wherein the communication protocol (e.g. USB 2.0) has low speed. For example, when music or video is transmitted between and the host device 110, the communication bandwidth is about 0.3 MB~3 MB.

The conventional accessing device communicates with a host device according to a communication protocol, wherein the communication protocol is fixed and cannot be adjusted. A fixed communication protocol cannot satisfy different accessing devices because the different accessing devices comprise different storage units and the different storage units have different communication speeds. On the contrary, since the communication protocol between the accessing device 120 and the host device 110 is adjustable, when the accessing device 120 comprises a storage unit with high communication speed, the communication protocol between the accessing device 120 and the host device 110 is adjusted according to the selection information $S_{SEL}$.

Figure 2:
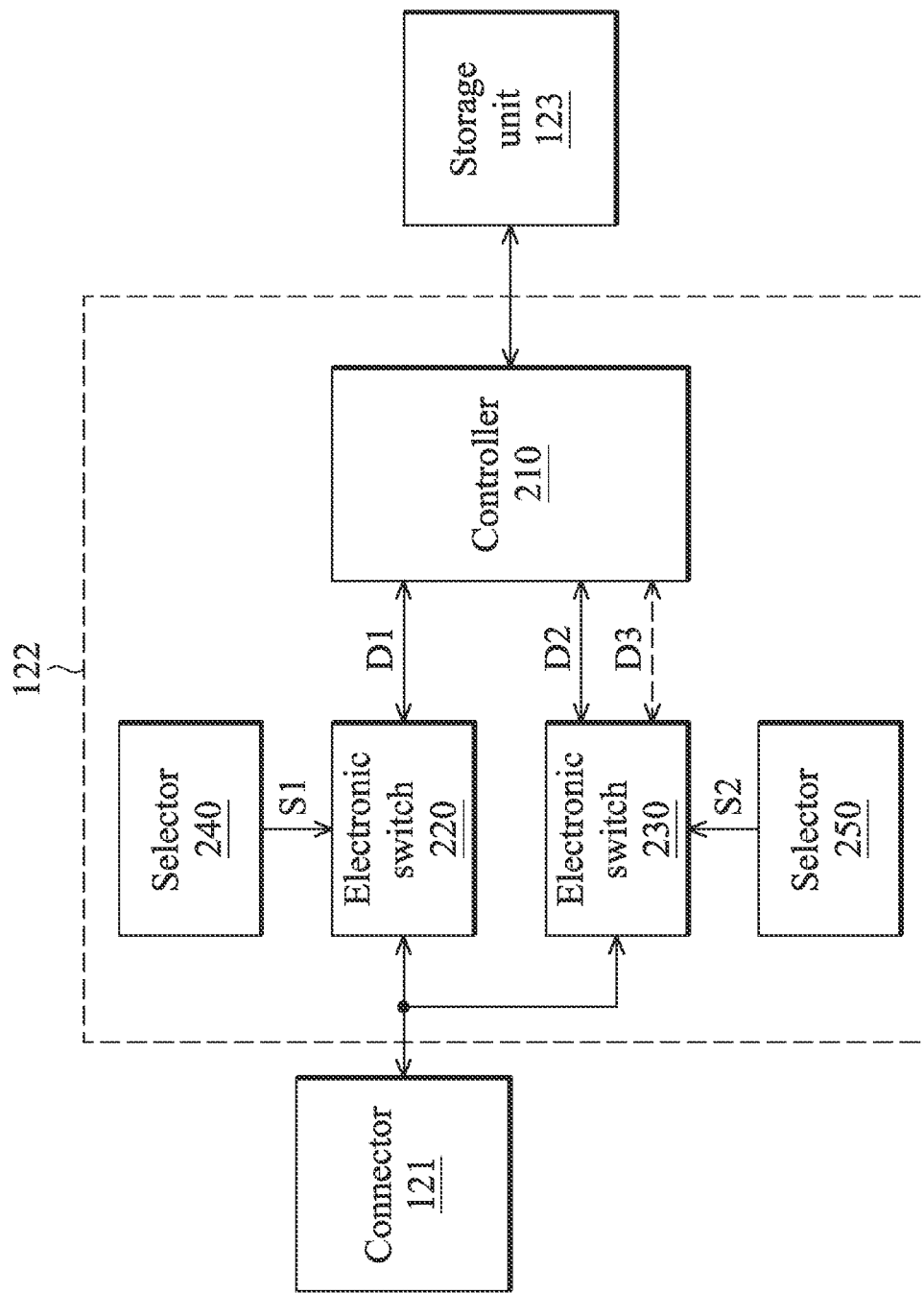
FIG. 2 is a schematic diagram of an exemplary embodiment of a control unit.

FIG. 2 is a schematic diagram of an exemplary embodiment of a control unit. In this embodiment, the communication protocol between the accessing device 120 and the host device 110 is determined according to a hardware structure (e.g. electronic switch). As shown in FIG. 2, the control unit 122 comprises a controller 210, electronic switches 220, 230 and selectors 240 and 250.

The controller 210 communicates with the storage unit 123 according to a first communication protocol to generate a communication result. The controller 210 generates first data D1 and second data D2 according to the communication result. In this embodiment, the controller 210 outputs the first data D1 and the second data D2 according to the different communication protocols. In one embodiment, the controller 210 is a bridge controller.

In other embodiments, the controller 210 further generates third data D3. The communication protocol transmitting the third data D3 is different from the communication protocol transmitting the first data D1 and the communication protocol transmitting the second data D2. In one embodiment, the controller 210 outputs the first data D1, the second data D2 and the third data D3 according to a USB 2.0 communication protocol, a USB 3.0 communication protocol and an eSATA communication protocol.

In one embodiment, the controller 210 transmits the first data D1 conforming to the USB 2.0 communication protocol via pins USB2_DP and USB2_DN (not shown). In another embodiment, the controller 210 comprises pins USB3_TX+, USB3_TX−, USB3_RX+ and USB3_RX− (not shown) to transmit the second data D2 conforming to the USB 3.0 communication protocol. In other embodiments, the controller 210 further comprises pins SATA_TX+, STAT_TX−, SATA_RX+, and SATA_RX− (not shown) to transmit the third data D3 conforming to the eSATA communication protocol.

The electronic switch 220 determines whether to transmit the first data D1 to the connector 121 according to a first control signal 51 of the selection information $S_{SEL}$. In one embodiment, when the first control signal 51 is asserted, the electronic switch 220 transmits the first data D1 to the connector 121. On the contrary, when the first control signal 51 is not asserted, the electronic switch 220 does not transmit the first data D1 to the connector 121.

The invention does not limit how the electronic switch 220 transmits the first data D1 between the controller 210 and the connector 121. In one embodiment, the electronic switch 220 is coupled between the pins USB2_DP, USB2_DN and the connector 121 to determine whether to transmit the first data D1 on the pins USB2_DP and USB2_DN to the connector 121 according to the first control signal 51.

The electronic switch 230 determines whether to transmit the second data D2 to the connector 121 according to a second control signal S2 of the selection information $S_{SEL}$. In one embodiment, when the second control signal S2 is asserted, the electronic switch 220 transmits the second data D2 to the connector 121. On the contrary, when the second control signal S2 is not asserted, the electronic switch 220 does not transmit the second data D2 to the connector 121.

The invention does not limit how the electronic switch 220 transmits the second data D2 between the controller 210 and the connector 121. In one embodiment, the electronic switch 220 is coupled between the pins USB3_TX+, USB3_TX−, USB3_RX+, USB3_RX− and the connector 121 to determine whether to transmit the second data D2 on the pins USB3_TX+, USB3_TX−, USB3_RX+, USB3_RX− to the connector 121 according to the second control signal S2.

In this embodiment, if the first control signal S1 and the second control signal S2 are not asserted, the electronic switch 230 transmits the third data D3 on the pins SATA_TX+, SATA_TX−, SATA_RX+ and SATA_RX− of the controller 210 to the connector 121.

The selector 240 is utilized to assert the first control signal S1. The selector 250 is utilized to assert the second control signal S2. In this embodiment, the selectors 240 and 250 are buttons and are arranged on the case of the accessing device 120. To set the communication protocol between the host device 110 and the accessing device 120, a user can press the button 240 or 250 to assert the first or the second control signal.

For example, when the user does not press the buttons 240 and 250, the communication protocol between the host device 110 and the accessing device 120 is an eSATA. When the user only presses the button 250, the communication protocol between the host device 110 and the accessing device 120 is a USB3.0. When the user only presses the button 240, the communication protocol between the host device 110 and the accessing device 120 is a USB 2.0.

Figure 3:
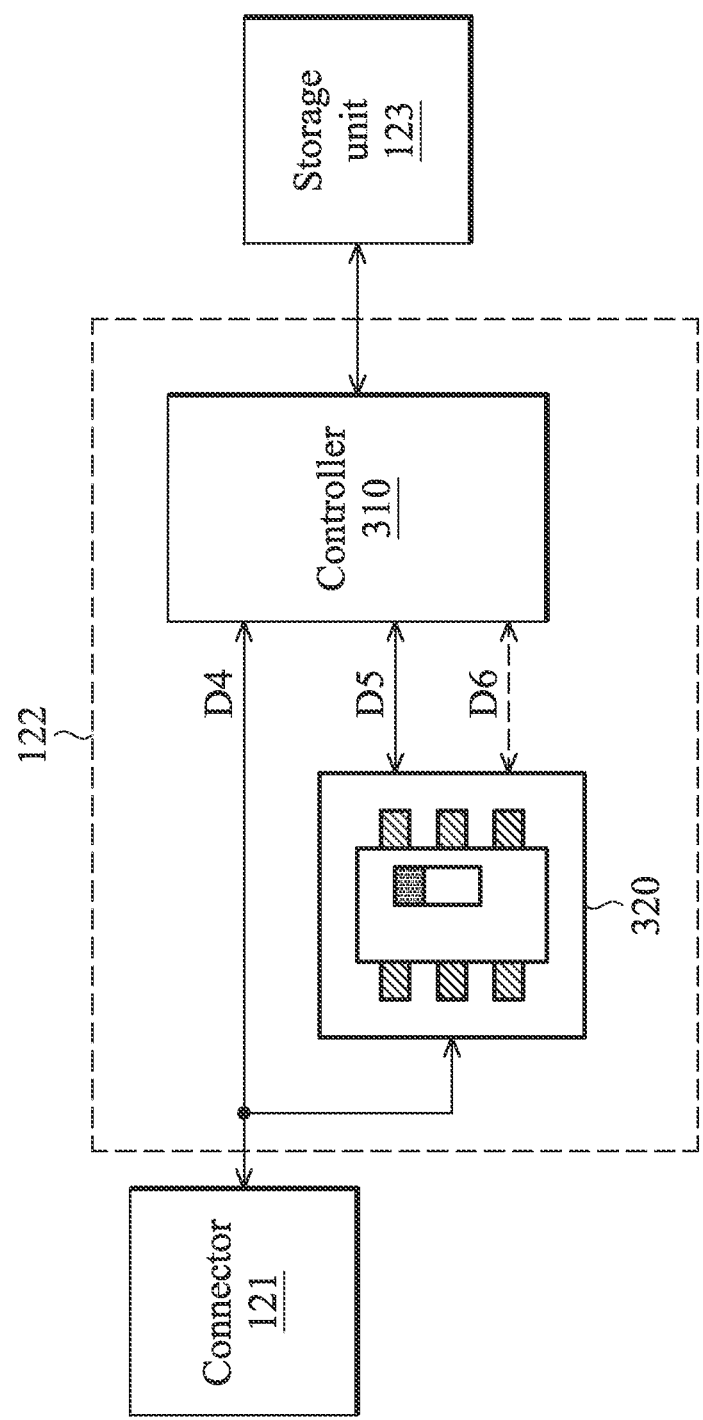
FIGS. 3 and 4 are schematic diagrams of other exemplary embodiments of the control unit.

FIG. 3 is a schematic diagram of another exemplary embodiment of the control unit. In this embodiment, the communication protocol between the accessing device 120 and the host device 110 is determined according to a hardware structure (e.g. mechanical switch). In one embodiment, the mechanical switch is a dip switch. As shown in FIG. 3, the control unit 122 comprises a controller 310 and a mechanical switch 320.

The controller 310 communicates with the storage unit 123 to generate a communication result. The controller 310 generates data D4 and D5 according to the communication result. The invention does not limit which communication protocol transmits the data D4 and D5. In this embodiment, the controller 310 transmits data D4 and D5 according to the different communication protocols. For example, the controller 310 transmits data D4 according to a USB 2.0 communication protocol and transmits data D5 according to a USB 3.0 communication protocol. In other embodiments, the controller 310 transmits data D6 according to an eSATA communication protocol.

The mechanical switch 320 is coupled between the controller 310 and the connector 121. The mechanical switch 320 determines whether to output data D5 to the connector 121 according to a switch state. Assuming that the mechanical switch 320 is a dip switch. To set the state of the mechanical switch 320, or the state of the selection information $S_{SEL}$, a user pokes the mechanical switch 320.

When the mechanical switch 320 is poked to a first state (i.e. the selection information $S_{SEL}$ is in a first state), the mechanical switch 320 does not transmit the data D5. At this time, the controller 310 directly transmits the data D4 to the connector 121. On the contrary, when the mechanical switch 320 is poked to a second state (i.e. the selection information $S_{SEL}$ is in a second state), the mechanical switch 320 transmits the data D5 on the pins USB3_RX+, USB3_RX−, USB3_TX+ and USB3_TX− of the controller 310 to the connector 121. In other embodiments, when the mechanical switch 320 is poked to a third state (i.e. the selection information $S_{SEL}$ is in a third state), the mechanical switch 320 transmits the data D6 to the connector 121.

Figure 4:
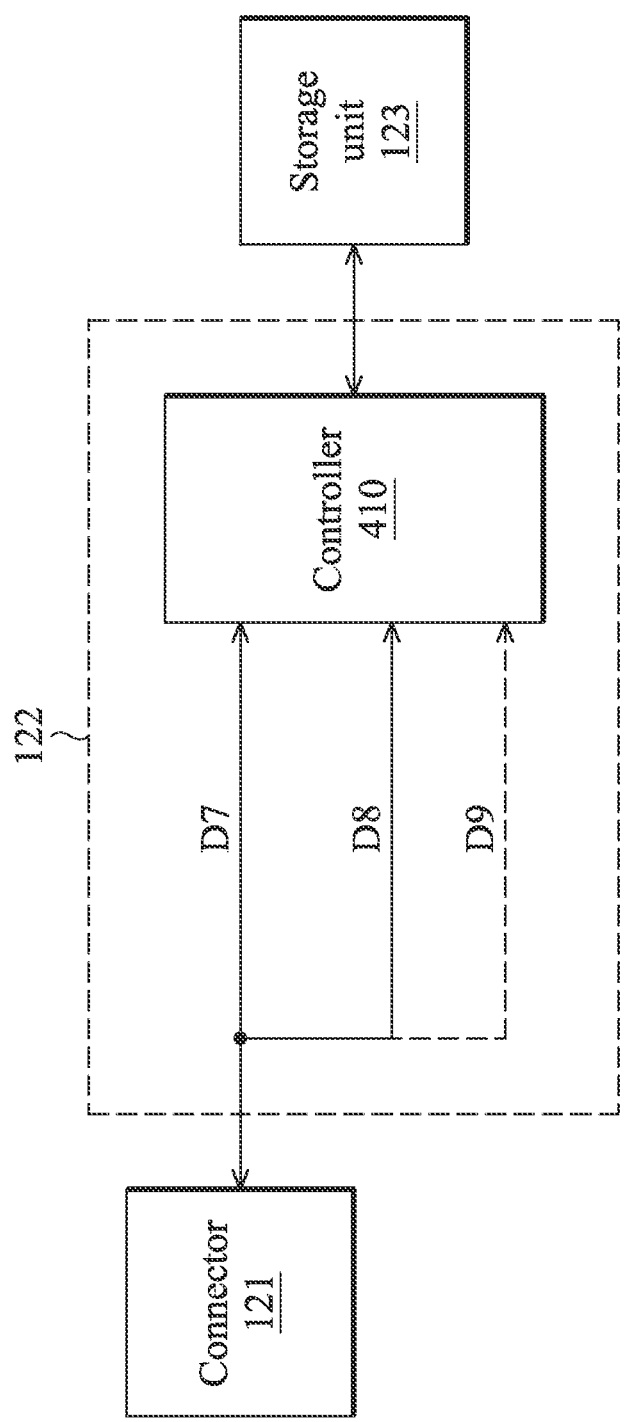

FIG. 4 is a schematic diagram of another exemplary embodiment of the control unit. In this embodiment, the communication protocol between the accessing device 120 and the host device 110 is determined according to a software method. Thus, no hardware switch is disposed in the control unit 122. As shown in FIG. 4, the control unit 122 comprises a controller 410.

The controller 410 communicates with the storage unit 123 to generate a communication result. The controller 410 generates data D7 or D8 according to the communication result. The invention does not limit which communication protocol transmits the data D7 or D8. In one embodiment, the controller 410 transmits the data D7 to the connector 121 according to a USB 2.0 communication protocol and transmits the data D8 to the connector 121 according to a USB 3.0 communication protocol. In other embodiments, the controller 410 transmits the data D9 to the connector 121 according to an eSATA communication protocol In this embodiment, the host device 110 outputs a control common (i.e. the selection information $S_{SEL}$) to the accessing device 120 according to at least one of a data flow amount and a transmittal time, wherein the control common determines which communication protocol is utilized by the accessing device 120.

For example, when an application of the host device 110 detects that the data flow amount of the accessing device 120 is low or the transmittal time of the accessing device 120 is short, the application sends a control common such that the controller 410 transmits the data D7 according to a USB 2.0 communication protocol. On the contrary, when an application of the host device 110 detects that the data flow amount of the accessing device 120 is high or the transmittal time of the accessing device 120 is long, the application sends another control common such that the controller 410 transmits the data D8 according to a USB 3.0 communication protocol. Additionally, if the data flow amount of the accessing device 120 is very high, or the transmittal time of the accessing device 120 is very long, the application sends another control common such that the controller 410 transmits the data D9 according to an eSATA communication protocol.

In other embodiments, a speed control application is installed in a Windows office system, thus, a USB power saving choice is added to a power change choice of the Windows office system. When an accessing device is connected to a host device with the Windows office system, the host device first communicates with the accessing device according to a first communication protocol with fast speed, e.g. USB 3.0. When the speed control application detects that the data flow amount of the accessing device is low and the transmittal time of the accessing device exceeds a pre-determined time, the application sends a control common to the accessing device. The accessing device first turns off a USB 3.0 path and then turns on a USB 2.0 path. Thus, the communication speed between the host device and the accessing device is reduced and the communication protocol between the host device and the accessing device is changed from USB 3.0 to USB 2.0.

Since the accessing device 120 can adjust the kind of the communication protocol between the accessing device 120 and the host device 110 according to selection information, the consumption of the accessing device 120 can be reduced to prevent the accessing device 120 from getting too hot.

Additionally, the kind of the communication protocol between the accessing device 120 and the host device 110 can be set by an automatic method or a manual method. Thus, the setting of the communication protocol is simple and the utility of the accessing device 120 is increased. In addition, a single connector is utilized to transmit the data with the different communication protocols between the accessing device 120 and the host device 110 such that the cost of the element is reduced.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An accessing device communicating with a host device, comprising:
   a connector for connecting to the host device;
   a storage unit storing data; and
   a control unit communicating with the storage unit according to a first communication protocol and communicating with the host device via the connector according to a second communication protocol, wherein the control unit determines the kind of the second communication protocol according to selection information,
   wherein the control unit comprises: a controller communicating with the storage unit according to the first communication protocol to generate a communication result, wherein the controller generates first data and second data according to the communication result, and the first and the second data conform two of the USB 2.0 communication protocol, the USB 3.0 communication protocol and the eSATA.

2. The accessing device as claimed in claim 1, wherein when the selection information is in a first state, the second communication protocol is one of a USB 2.0 communication protocol, a USB 3.0 communication protocol and an external serial advanced technology attachment (eSATA), and when the selection information is in a second state, the second communication protocol is another of the USB 2.0 communication protocol, the USB 3.0 communication protocol and the eSATA.

3. The accessing device as claimed in claim 1, wherein the control unit further comprises: a first electronic switch transmitting the first data to the connector when a first a second electronic switch transmitting the second data to the connector when a second control signal of the selection information is asserted; a first selector for asserting the first control signal; and a second selector for asserting the second control signal.

4. The accessing device as claimed in claim 1, wherein the control unit further comprises: a mechanical switch coupled between the controller and the connector, wherein when the selection information is in the first state, the mechanical switch does not transmit the second data and the controller directly transmits the first data to the connector, and when the selection information is in the second state, the mechanical switch transmits the second data.

5. The accessing device as claimed in claim 1, wherein the selection information is provided from the host device.

6. The accessing device as claimed in claim 1, wherein the storage unit is a solid state drive (SSD) or a hard disk drive (HDD), and the first communication protocol is an eSATA.

7. The accessing device as claimed in claim 1, wherein the storage unit is a memory card, and the first communication protocol is a secure digital extended capacity (SDXC).

8. The accessing device as claimed in claim 1, wherein the storage unit is a flash memory or a NAND flash memory, and the first communication protocol is a common flash memory interface (CFI) protocol or an open NAND flash interface (ONFI) protocol.

9. The accessing device as claimed in claim 1, wherein the connector is a USB 3.0 connection.

10. The accessing device as claimed in claim 1, wherein when connector connects to the host device, the host device first communicates with the accessing device according to a USB 3.0 communication protocol, and
    when a data flow amount of the accessing device is less than a pre-determined amount and a transmittal time of the accessing device exceeds a pre-determined time, the host device first communicates with the accessing device according to a USB 2.0 communication protocol.

11. The accessing device as claimed in claim 1, wherein the host device has an application, the application detects a data flow amount of the accessing device and the a transmittal time of the accessing device to generate a detection result, the application sends a control common according to the detection result, and the controller determines the kind of the second communication protocol according to the control common.

12. The accessing device as claimed in claim 11, wherein when the data flow amount of the accessing device is less than a first pre-determined amount or the transmittal time of the accessing device is less than a first pre-determined time, the control unit communicates with the host device according to a USB 2.0 communication protocol,
    when the data flow amount of the accessing device is higher than the first pre-determined amount and less than a second pre-determined amount or the transmittal time of the accessing device is higher than the first pre-determined time and less than a second pre-determined time, the control unit communicates with the host device according to a USB 3.0 communication protocol, and
    when the data flow amount of the accessing device is higher than the second pre-determined amount and less than a third pre-determined amount or the transmittal time of the accessing device is higher than the second pre-determined time and less than a third pre-determined time, the control unit communicates with the host device according to an eSATA communication protocol.

* * * * *